June 4, 1968 R. W. FORWARD 3,386,757
COMBINATION MOLD AND FASTENING MEANS
Original Filed Feb. 23, 1965 3 Sheets-Sheet 1
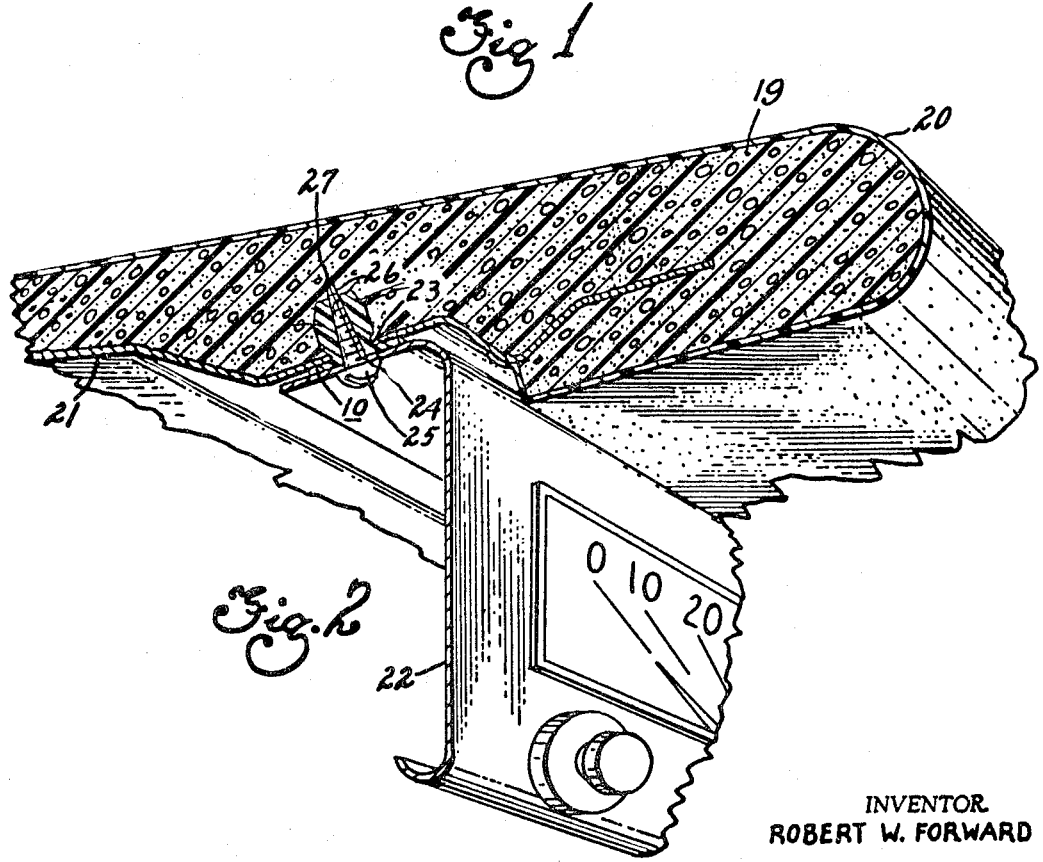
INVENTOR.
ROBERT W. FORWARD
BY
Richard G. Stahl
ATTORNEY June 4, 1968  R. W. FORWARD  3,386,757
COMBINATION MOLD AND FASTENING MEANS
Original Filed Feb. 23, 1965  3 Sheets-Sheet 2
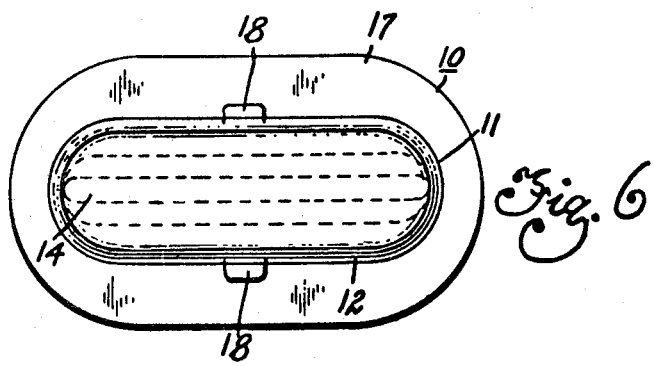
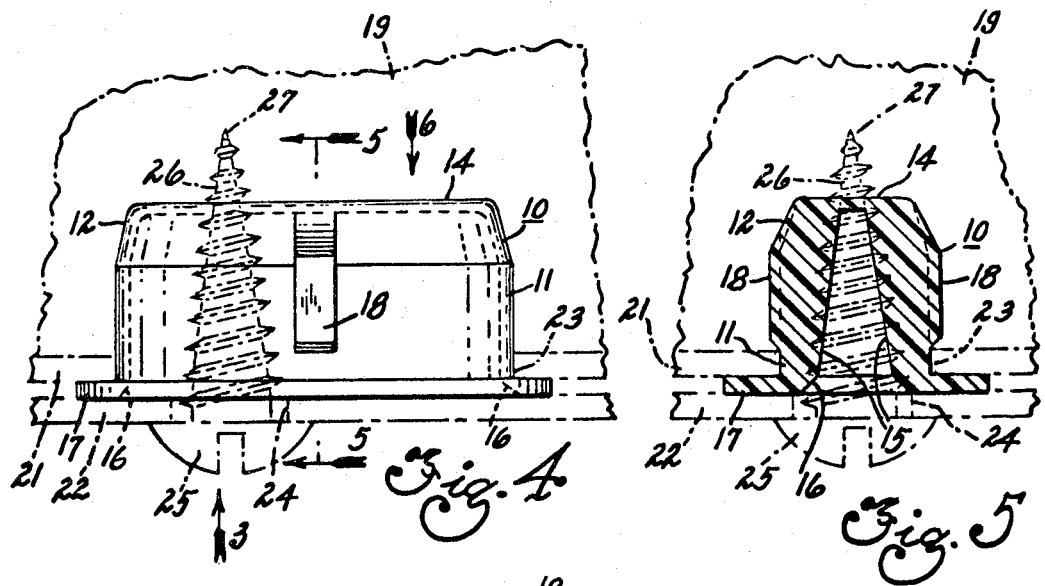
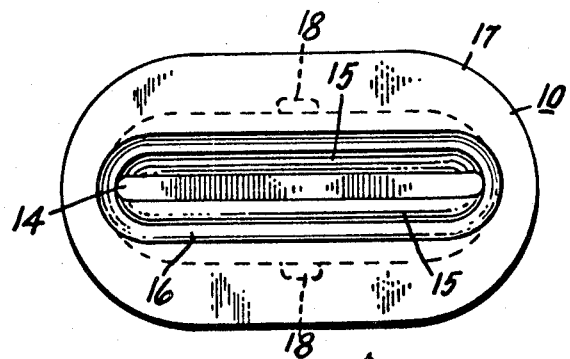
INVENTOR.
ROBERT W. FORWARD
BY
ATTORNEY June 4, 1968 R. W. FORWARD 3,386,757
COMBINATION MOLD AND FASTENING MEANS
Original Filed Feb. 23, 1965 3 Sheets-Sheet 3
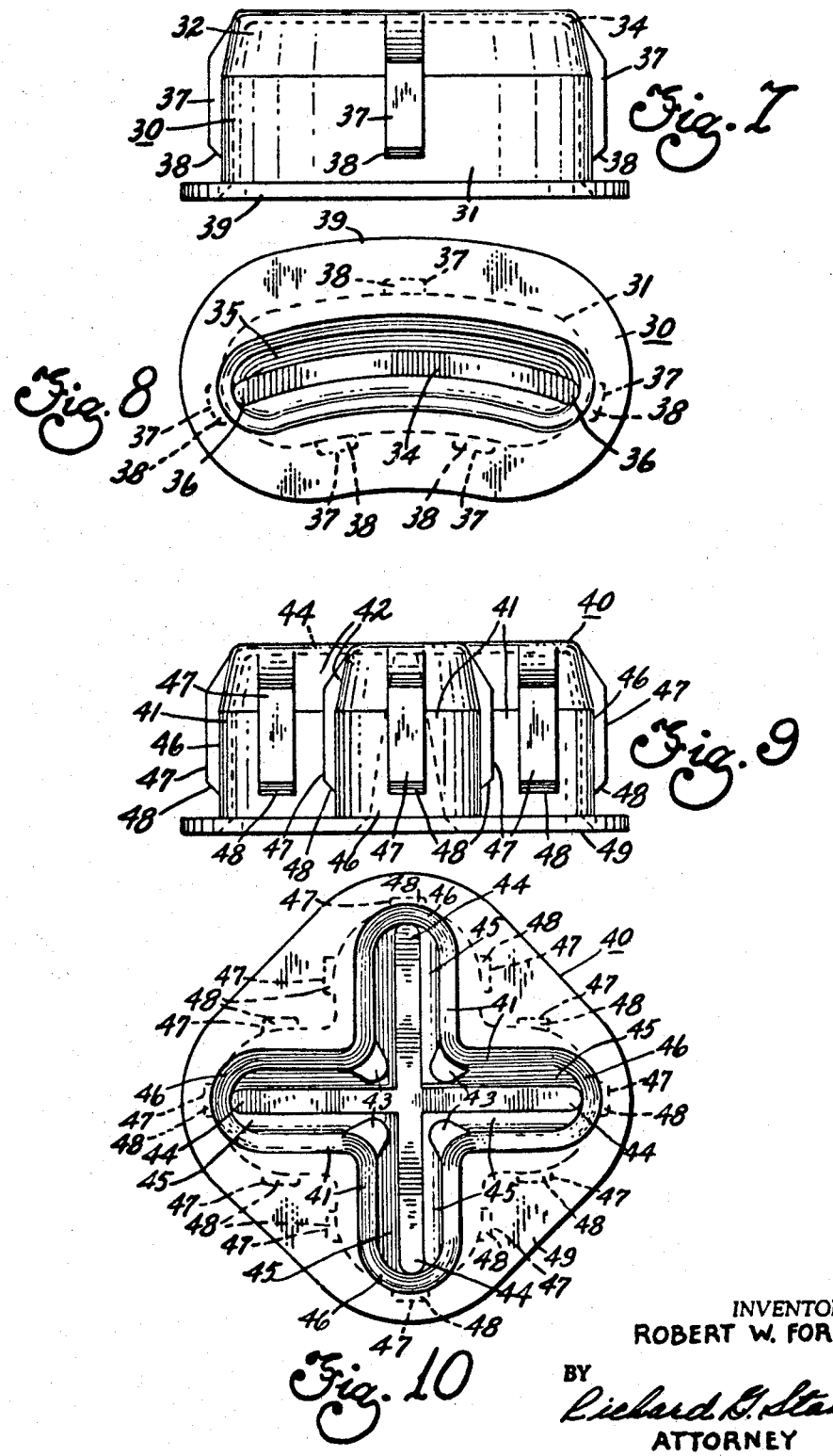
INVENTOR.
ROBERT W. FORWARD
BY
Richard G. Stahl
ATTORNEY

United States Patent Office 3,386,757
Patented June 4, 1968

3,386,757
COMBINATION MOLD AND FASTENING MEANS
Robert W. Forward, Centerville, Ohio, assignor to General Motors Corporation, Detroit, Mich., a corporation of Delaware
Original application Feb. 23, 1965, Ser. No. 434,299, now Patent No. 3,334,410, dated Aug. 8, 1967. Divided and this application Feb. 23, 1967, Ser. No. 618,036
4 Claims. (Cl. 287—189.36)

ABSTRACT OF THE DISCLOSURE

A fastening arrangement for mounting bodies on panels, particularly panels which have coverings foamed onto them. A resilient plastic plug having an elongated recess for reception of a tapering screw is inserted through a hole in the panel and blocks the hole. The body to be fastened to the panel is held by a screw which enters between the converging walls of the recess in the plug and may penetrate the end of the plug. The elongation of the recess tolerates misalignment of the body and panel.

---

This is a division of application Ser. No. 434,299, filed Feb. 23, 1965, now Patent No. 3,334,410.

This invention relates to the fastening together of parts such as vehicle components and particularly to fastener means adapted to be employed in the method claimed in my application Ser. No. 434,299 filed Feb. 23, 1965, now Patent No. 3,334,410. Particularly, the invention relates to fastening means including a resilient plastic plug having an elongated recess or slot for reception of a tapering screw notwithstanding misalignment of the parts which are held together, and which is a structure acting to block the hole in which the plug is mounted to prevent escape of foam or other material in the process to which the parent application is directed.

The principal object of the invention is to provide an improved fastener combination, one which is tolerant of dimensional variations in the parts to be fastened, one which closes openings in one of the parts which are fastened together, and one which is extremely economical and practical.

Further objects and advantages of the present invention will be apparent from the following description, reference being had to the accompanying drawings wherein preferred embodiments of the present invention are clearly shown.

In the drawings:

FIGURE 1 is representative of assembly procedural steps in accordance with the present invention.

FIGURE 2 illustrates fragmentary portions of adjacent apertured panels one of which has polymer foam covering and combination plug-fastener means readily engageable by screw-prong-type fasteners despite inaccuracy between apertures of adjacent panels.

FIGURE 3 is a plan view of the combination plug-fastening means for use in accordance with the present invention and taken in direction of arrow 3 in FIGURE 4.

FIGURE 4 is a side view of combination plug-fastening means of FIGURE 3.

FIGURE 5 is a cross-sectional view taken along line 5—5 in FIGURE 4.

FIGURE 6 is a plan view of the combination plug-fastening means taken in direction of arrow 6 in FIGURE 4.

FIGURES 7 and 8 as well as FIGURES 9 and 10 are side and plan views respectively of two additional embodiments of combination plug-fastening means.

During manufacture of vehicle instrument and dashboard assembly such as illustrated for example by disclosures of Patents 3,042,137—Mathues et al. issued July 3, 1962, and 3,088,539—Mathues et al. issued May 7, 1963 there can be provided a flange portion of a metal insert means having a polymer foam material on one side thereof in a location where an aperture or slot is provided for mounting purposes. Previously, it has been practiced to attempt to cover such apertures or slots with a removable shielding having a "jelly-cup" configuration subject to subsequent insertion of a metal clip through an adjacent slot or opening. Such a metal clip must be handled separately and considerable effort is required to insert such a clip through an adjoining slot or opening and yet retain or obtain proper alignment of the clip per se as to the aperture or slot through which mounting means for fastening are to be installed. During mass production operations a time factor is important and tedious trial and error alignment of such a separable metal clip as well as the shielding prior to any such attempted clip insulation can result in considerable expenditure of time and energy. Furthermore, it is frequently found that the shielding for the aperturing and openings or slots is inaccurately placed and ineffective to keep the foam polymer material from escaping through the openings in the metal insert thus providing a messy leakage which further complicates the problem of installing the separable metal clip means properly in alignment.

Assembly procedure in accordance with the present invention as represented in a view of FIGURE 1 can provide a combination of features to result in an improved end product and greatly facilitated mass production operations. FIGURE 1 provides a chart in which predetermined procedural steps are listed. The procedural steps involve use of a combination plastic plug-fastener means generally indicated by numeral 10 in views of FIGURES 2 through 6 inclusive in the drawings. This combination plug-fastener means has an elongated main body portion 11 which has an inwardly tapered siding 12 peripherally around a thinned bottom or base 14 best seen in views of FIGURES 4 and 5. Internal surfacing of the main body portion 11 has comparable oppositely tapered inner walls 15. A further generally oblong-shaped guide taper portion 16 is provided laterally inwardly from an outwardly extending flange portion 17 integral with the main body portion 11 and having a corresponding oblong or elongated shape. This oblong or elongated shape results from having the opposite walls with surfacing 15 considerably longer than the width of the cavity or opening accessible by way of the tapered surfacing 16. The plastic material from which the combination plug-fastener means is made can be a suitable polyamide, acetal resin and the like with sufficient resilience to permit snap-fitting thereof into a panel aperture or elongated slot substantially complementary to the body portion 11. To assure anchoring of the body portion 11, the opposite longer sidewalls along an exterior thereof on the body portion 11 have opposite cam locking portions 18. The body portion 11 of the combination plastic plug-fastener means serves to seal off an opening through which insertion is made by having a foam covering 19 indicated in views of FIGURES 2 and 5 in a surrounding relationship to the body portion relative to a dashboard insulation covering 20 such as vinyl and the like as well as a first dashboard panel means 21 and a second body mounting panel means 22 for the dashboard assembly. The first or dashboard panel portion 21 can have an elongated opening or slot 23 therethrough an a lower mounting panel 22 can have a corresponding elongated aperture or slot 24 therethrough. Due to manufacturing tolerances and other inaccuracies it frequently occurs that there is misalignment between such openings 23 and 24 at least in one direction represented by the greater length of the oblong configuration of the openings as well as the combination plastic plug-fastener means 10. The combination plastic plug-fastener means serves both to seal off the opening 23 during foaming of a crashpad covering directly onto one side of the dashboard panel 21 and also to assure clean access to an elongated space in which misalignment can be compensated for relative to a corresponding opening 24 in the panel 22. A fastening means including an enlarged head portion 25 and a tapered shank 26 has been outlined in views of FIGURES 2, 4 and 5 and it is to be noted that a sharp point or end 27 of such fastening means can pierce the base 14 of the combination plastic plug-fastener means either by threading or by barbed force fit thereto for establishing an interlock and mounting of the panels 21 and 22 adjacent to each other regardless of the presence of cured foam material 19. The combination plastic plug-fastener means serves to retain the foam in proper position which once cured will not escape or leak through any opening even when a fastening means is installed. The foam covering 19 can be provided with reinforcement as disclosed in Patents 3,042,137 and 3,088,539 noted earlier. The combination plastic plug-fastener means can remain in position as installed by snap-fitting. Considerable time and effort is eliminated by obviating need for any separate metal clip means to be installed with difficulty in an area where the foam 19 and first panel 21 intersect. Installing a screw-prong fastening means such as 25-26-27 can be accomplished readily through elongated slots or openings of adjacent panels accompanied by locking engagement of the fastening means with the elongated plastic body portion of the combination plug-fastener means. The elongated configuration of the combination plastic plug-fastener means accommodates and compensates for possible misalignment without any blind searching through foamed material such as 19 in an attempt to find a pair of corresponding openings to fit together in limited access space where previously an additional metal clip had to be installed also. Use of a paper cup for shielding subject to placement and removal before using a "Tinnerman-type" spring clip member is also obviated.

The combination plug-fastener means 10 used in conjunction with elongated openings permits longitudinal adjustment between inaccurately spaced holes of adjoining panels. The foam material which can be made of any suitable composition such as polyurethane, isocyanate and the like actually aids in holding the plastic combination plug-fastener means in place. The combination plastic plug-fastener means 10 has sufficient resilience to hold tight with a friction lock as to the fastening device 25-26-27. The assembly procedure is greatly expedited and the plug- or cup-like elongated fastening means provides latitude where the openings or holes fail to line up accurately in a sideways direction. The elongated body portion 11 of the plastic plug-fastener means 10 in effect provides a cavity of sufficient strength in the plastic foam material of the vehicle dashboard or crash pad and also eliminates need for any separate shielding cup of paper as well as the metal spring clip or so called "J" nut used previously. A relatively long path along the bottom portion 14 of the combination plastic plug-fastener means can accommodate quite a difference of lateral misalignment though permitting accomplishment of a mating assembly of adjacent panels readily along a mass production assembly line.

FIGURES 7 and 8 illustrated another embodiment of combination plug-fastening means 30 substantially like that previously described but having a crescent or kidney shaped body portion 31 having inwardly tapered siding 32 peripherally around a thinned bottom or base 34. Internal surfacing of the main body portion 31 has comparable oppositely tapered inner walls 35. Opposite ends 36 of internally curved spacing of the crescent or kidney shaped body portion 31 are offset from spacing therebetween so that both lateral and limited radial offsets in alignment can be accommodated when a screw-prong fastening means installation is made as noted earlier. It is to be understood that the combination plug-fastening means in FIGURES 7 and 8 can fit complementary to a panel slot or opening stamped accordingly and outwardly projecting plural abutments or axially extending lugs 37 defining shoulders 38 to one side of crescent or kidney shaped flanging 39 integral with the body portion 31 can be provided for interlock snap fit in a sealing position as to the panel.

FIGURES 9 and 10 show still a further embodiment of combination plug-fastening means 40 having an X-shaped or crossed main body portion 41 with inwardly tapered siding 42. At a central internal intersection of the cavitation or spacing defined by the X-shaped or crossed main body portion there are cornering extensions 43 that assure engagement of screw-prong fastening means at dead center location free of wobble or looseness laterally though axially such fastening means noted previously can pierce through thinned bottom or base 44 centrally as well as in any of four diametrically opposite locations. Internal surfacing of the main body portion in each of the four directions has opposite tapered inner walls 45. Rounded corners or ends 46 are provided for termination of each of the directions of the X-shaped or crossed body portion structural formations and offsets transversely can be accommodated for fitting complementary panel openings and mating fastening means regardless of manufacturing tolerance ranges and/or inaccuracy of alignment resulting therefrom. Outwardly projecting plural abutments or axially extending lugs 47 define shoulders 48 to one side of a substantially squared laterally integral flanging 49 integral with the body portion 41.

The combination plug-fastening means of each embodiment as made of plastic material can block off foam material to prevent escape thereof through panel openings used for dashboard mounting door or sheet panels for example. Also such combination plug-fastening means can seal holes or openings where blind access with fasteners is to be encountered. Weather or water proofing seal of such holes or openings in panels can be achieved together with fastener installation regardless of slight misalignment that may be encountered.

While the embodiments of the present invention herein disclosed constitute preferred forms, it is to be understood that other forms might be adopted.

What is claimed is:
1. The combination of:
   a panel having an elongated slot,
   a plug-fastener of resilient plastic material extending through the slot and having a flange overlying the panel,
   the plug-fastener having a body of oblong outline in planes parallel to the panel and including substantially flat side walls converging toward each other in the direction away from the panel to define a generally wedge-shaped recess between the side walls, and including a base wall extending across and closing the end of the recess so that the plug-fastener covers and closes the slot,
   the plug-fastener also including detent portions extending outwardly from the body in position to engage the opposite side of the panel from the said flange to retain the plug-fastener on the panel when applied to the panel,
   a device overlying the panel and abutting the flange, the device having a hole through the device disposed over the plug-fastener,
   and screw-prong fastening means having a head engaging the device and a tapered threaded shank extending into the recess in the plug-fastener bearing against and cutting into the side walls to retain the device on the panel.
2. A combination as recited in claim 1 in which the said base wall is adapted to be pierced by the fastening means.

3. A combination as recited in claim 2 in which the fastening means extends through the said base wall.

4. A combination as recited in claim 1 in which the detent portions extend outwardly from the said side walls.

References Cited

UNITED STATES PATENTS

| | | | |
|---|---|---|---|
| 2,427,742 | 9/1947 | Peterson et al. | 16—2 |
| 2,784,865 | 3/1957 | Rieke | 85—80 |
| 2,859,930 | 11/1958 | Brunsting et al. | 85—32 |
| 2,943,373 | 7/1960 | Rapata | 85—80 |
| 3,127,965 | 4/1961 | Weisenberger | 24—73 |
| 3,200,694 | 8/1965 | Rapata | 85—82 |
| 3,251,103 | 5/1966 | Saut | 24—73 |

FOREIGN PATENTS

| | | |
|---|---|---|
| 160,795 | 1/1925 | Australia. |
| 1,101,865 | 3/1961 | Germany. |
| 996,455 | 6/1965 | Great Britain. |
| 42,188 | 12/1917 | Sweden. |

MARION PARSONS, Jr., *Primary Examiner.*